United States Patent
Corvi et al.

[15] 3,673,590
[45] June 27, 1972

[54] DEVICE TO DETECT MOTION

[72] Inventors: Joseph A. Corvi, Newport Beach; William G. Lawrence, Costa Mesa, both of Calif.

[73] Assignee: Corvonics Corporation, Costa Mesa, Calif.

[22] Filed: Oct. 8, 1969

[21] Appl. No.: 864,586

[52] U.S. Cl. ......................... 340/258 A, 343/7.7, 343/17.1
[51] Int. Cl. ............................................. G08b 13/00
[58] Field of Search ............ 340/258 R, 258 A, 258 B, 258 C; 343/17.1, 7.7

[56] References Cited

UNITED STATES PATENTS

| | | | |
|---|---|---|---|
| 3,161,876 | 12/1964 | Barker | 340/258 A UX |
| 3,205,352 | 9/1965 | Prucha | 340/258 C X |
| 2,767,393 | 10/1956 | Bagno | 340/258 A |
| 3,193,823 | 7/1965 | Laakmann | 340/258 A |

Primary Examiner—John W. Caldwell
Assistant Examiner—Michael Slobasky
Attorney—Finkelstein and Mueth

[57] ABSTRACT

A motion detector in which an oscillator-detector transmits a series of narrow bursts of radio frequency, electromagnetic energy, the period of which varies as a function of the radial motion of the object relative to the detector, and the varying pulse frequency provides information that an object is moving radially.

Such a detector in which the varying pulse frequency of the oscillator-detector is converted to a varying D.C. voltage the magnitude of which varies at a rate determined by the rate of movement of the object, the varying voltage effecting energization of an alarm.

10 Claims, 2 Drawing Figures

PATENTED JUN 27 1972  3,673,590

INVENTORS
JOSEPH A. CORVI
WILLIAM G. LAWRENCE
BY
Newton H. Lee, Jr.

DEVICE TO DETECT MOTION

BACKGROUND OF THE INVENTION

Various devices have been heretofore provided for detecting the presence of an intruder and initiating an alarm. Such devices have included ultrasonic and microwave motion detectors and have also included listening systems using a sound actuated switch.

Each of the prior devices is subject to the problem of false or undesired alarms. The ultrasonic devices will respond to various disturbances of the air such as the initiation of operation of an air conditioner, or wind blowing against doors or windows. Various noises not attributable to an intruder may initiate the listening types of devices. Microwave radar sets are, in general, expensive and may respond to various signals and motions which are far removed from an area protected by an alarm system. As a result, most alarms given by the extant automatic devices for detecting intruders are false alarms.

SUMMARY OF THE INVENTION

The present invention obviates some of the problems encountered by the prior devices. The detector of the present invention utilizes radiofrequency, electromagnetic signals which are not affected by disturbances of the air or by noises.

More particularly, the invention employs a combined signal transmitter and receiver which employs an oscillator-detector circuit which transmits narrow bursts of radiofrequency, electromagnetic energy the period of which varies as a function movement of an object in the field of the transmitter, and the varying pulse frequency provides information which may be employed to trigger an alarm or to measure the rate of movement of the object.

The oscillator-detector means is adapted to be installed in an area to be monitored, and so long as there is no motion in the field of the transmission, the energy fed back to the device will remain constant, but when motion occurs, there is resultant change in the period between the transmitted bursts. Thus, the invention also contemplates combining the oscillator-transmitter with a frequency discriminator to detect the changes in the period of the transmitted bursts, the output from the frequency discriminator providing information indicative of the rate of motion, and more particularly being herein disclosed as being amplified and employed to effect the triggering of a relay which in turn controls a suitable alarm.

In the use of the invention, the movement of a object in the field of the oscillator-detector, causes a standing wave motion which affects the periodicity of the frequency of the oscillator-detector. Since the motion of the standing wave is caused by and is proportional to the relative motion of the object in the field of the oscillator-detector, the signal caused in the oscillator is self-calibrating as the frequency increases when the object approaches the oscillator-detector and decreases when the object moves away from the oscillator-detector.

Among the objects of the invention is the provision of a motion detector, which requires fewer components, is comparatively simple, of small size, light weight, and inexpensive.

Other advantages and objects of the invention will be hereinafter described or will be apparent to those skilled in the art, and the novel features of the invention will be defined in the appended claims.

DESCRIPTION OF THE PREFERRED EMBODIMENT

Figure 1:
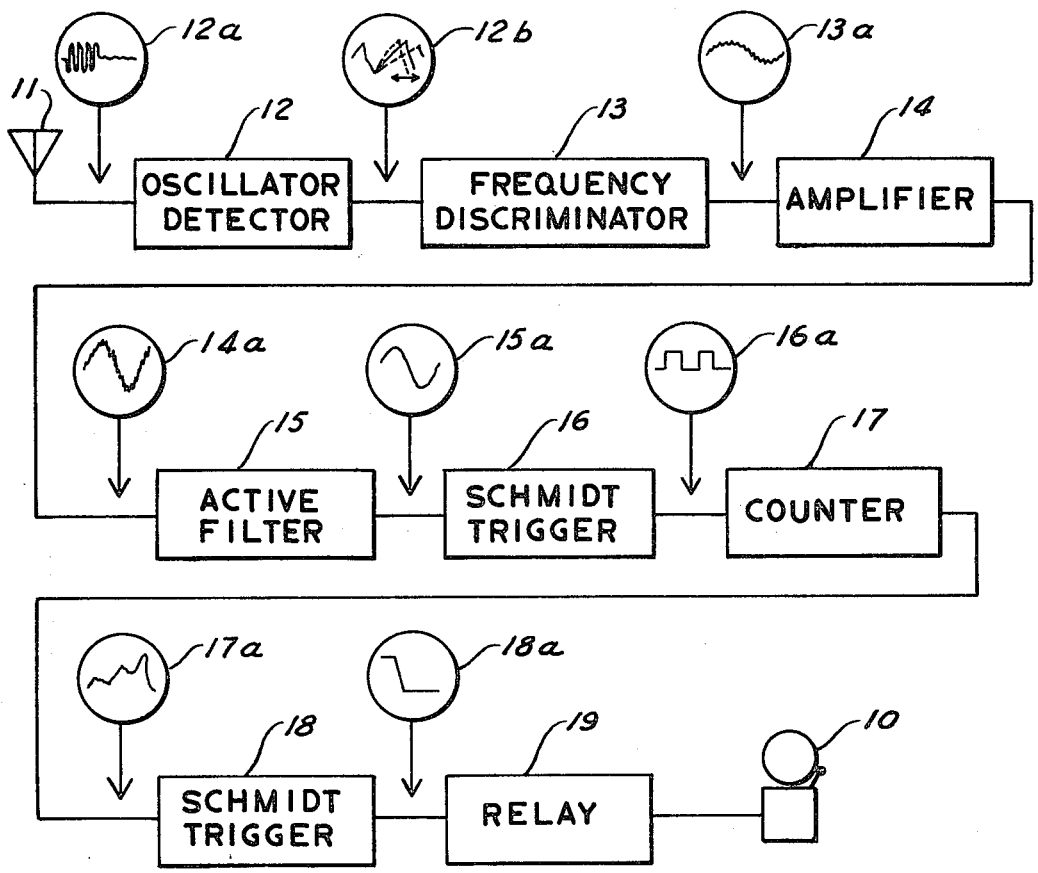
FIG. 1 is a block diagram of a device to detect motion embodying the invention.

Referring first to FIG. 1, there is generally illustrated a means for effecting the operation of alarm means 10, shown as a bell, but the alarm means may be any suitable other alarm or signal producing device, such as a remote indicator light, as may be desired.

The means for effecting operation of the alarm 10 comprises an antenna 11 which is connected to an oscillator-detector 12, the details of which are more particularly illustrated in FIG. 2 and which will be hereinafter more fully described.

The oscillator-detector 12, as will be later described, is so constructed as to constantly transmit a series of narrow bursts of radiofrequency electromagnetic energy, illustrated at 12a, the periodicity of which remains constant in the absence of a moving object in the field of the radiated energy. If a moving object is in the field, then the period between pulses will vary as a function of the distance of the object from the antenna 11. The frequency of the signal is a Doppler frequency, increasing as the object moves toward the antenna and decreasing as the object moves away from the antenna. With each burst of energy transmitted, a negative-going pulse, as illustrated at 12b, is supplied to a frequency discriminator 13 at a frequency dependent upon the existence or non-existence of an intruder or unusual object in the field of the oscillator-detector.

As is well known, the frequency discriminator 13 provides means adapted to convert the varying pulse frequency supplied from the oscillator-detector to a varying D.C. voltage the magnitude of which varies in proportion to variation in the frequency of the input signal, and thus, the magnitude of the D.C. voltage of the frequency discriminator is a function of movement of an object in the field of the oscillator-detector. The magnitude of the D.C. voltage varies at a rate determined by the rate at which the object moves toward or away from the antenna 11, and the magnitude of the variation is a function of distance of the object from the antenna, being greatest for nearby objects.

Essentially, the frequency discriminator is a typical monostable multivibrator which provides pulses of constant width and amplitude at a rate determined by the input from the oscillator-detector. The output from the frequency discriminator provides a D.C. voltage determined by the amplitude, width and rate of the pulses. Amplitude and width are constant, and therefore, the magnitude of the voltage is directly proportional to frequency and inversely proportional to the period of the oscillator-detector. The output from frequency discriminator 13 is illustrated at 13a, and is supplied to an amplifier 14.

The amplifier 14 increases the magnitude of the frequency discriminator output to a value useful by the other components of the system, the output from the amplifier being illustrated at 14a.

Preferably, the output from the amplifier 14 is supplied to an active filter 15, this filter being a low pass filter providing means adapted to remove from the pulses high frequency noise components, particularly those related to the frequency at which the radio frequency bursts emanate from the oscillator-detector. The output from the filter 15, as illustrated at 15a, is supplied to a typical Schmidt trigger 16.

This trigger provides means adapted to provide signals of constant amplitude, as illustrated at 16a, to a counter 17. The hysteresis of the Schmidt trigger circuit prevents minor noise fluctuations from causing output pulses. Only signals resulting from motion sensed by the oscillator-detector 12 will be supplied to the counter 17.

The counter 17 may be any typical counter circuit which provides means for necessitating that a selected number of signals, say three signals as illustrated at 17a, be supplied to the counter 17 in order to activate the alarm.

The output from the counter 17 is supplied to another Schmidt trigger circuit 18 which provides means for producing an output signal, as illustrated at 18a, when the counter output indicates that the necessary number of input signals have been received by the counter 17. The output signal from the second Schmidt trigger 18 is supplied to a suitable relay 19 which is adapted to cause energization of the alarm 10.

Preferably, the relay 19 is normally energized, and the alarm 10 is activated when the relay is de-energized, so that shutting off power to the detector system will automatically cause energization of the alarm.

It will now be appreciated that the components generally described above minimize the probability of false alarms being given, so that the system is particularly sensitive only to the motion of an object in the energy field produced by the oscillator-detector 12, which will now be more fully described.

Figure 2:
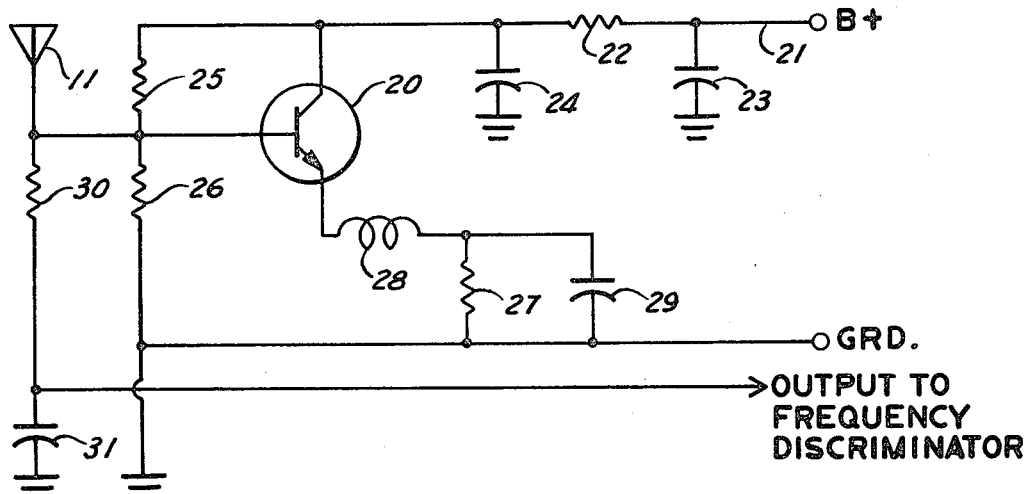
FIG. 2 is a schematic of the novel oscillator-detector of FIG. 1.

Referring to FIG. 2, there is illustrated an exemplary oscillator-detector circuit which combines the transmitting and receiving functions in a simple, single transistor circuit.

Included in the circuit is an NPN-transistor 20, input voltage is supplied to the transmitter from the source conductor 21 through a resistor 22 adapted to limit the supply voltage to a desired value. A filter 23 is also preferably in the supply to the collector of the transistor 20. An RF ground including the capacitance 24 is also connected to the collector of the transistor.

Connected between the source and the base of the transistor 20 is a control resistor 25, and a second control resistor 26 is interposed between the base of the resistor and the ground. These resistors 25 and 26 are employed to establish the operating point of the transistor 20. A further resistor 27 is interposed between the ground and the emitter of the transistor 20 and serves to control the operating point of the transistor, an inductance 25 being interposed between the resistor 27 and the transistor emitter, and an RF bypass capacitance 29 being connected to the ground between the resistance 27 and the inductance 28.

Connected to the transistor base between the resistances 25 and 26 and to the antenna 11 is a resistance 30, which, if desired, may be variable, for reasons which will appear hereinafter. This resistor 30 is also connected to the output conductor to the frequency discriminator 13, and a filter capacitor 31 is interposed between the resistor 30 and the output conductor to the frequency discriminator 13.

The range of the oscillator-detector may be varied by adjusting the various values of the components in such a manner that the oscillator turns itself off and restarts. The device will always be used in a given environment which will reflect energy back to the detector. Provided there is no moving object in the field, the magnitude and phase of the energy returned to the device remain essentially constant with respect to the transmitted signal. The oscillator requires that a signal be fed back from output to input in phase with the input signal, and, thus, large oscillations can build up from ever-present random noise fluctuations. The rate at which the oscillations build up is function of the amount of energy feedback. The detector relies on energy returned from the surroundings for a portion of the feedback signal. This energy may have any phase relative to the transmitted signal, but in the event there is no moving object, the phase remains constant.

On the other hand, if there is an intruder or other moving object in the field of the device, the phase of the returned energy will change with the motion, and the rate of buildup of oscillations will accordingly change. This results in changes in the period between transmitted bursts which are detected by the frequency discriminator.

More specifically, in respect of the circuit of FIG. 2, the oscillator-detector may be made self quenching. The capacitor 29 tends to charge while the oscillator-detector is oscillating, eventually the charge on capacitor 24 reaching a value sufficiently near the peak base voltage of the transistor, that oscillations will cease if the capacitor 29 cannot discharge between each cycle of the radio frequency input. Oscillations will cease until the capacitor 29 discharges sufficiently to allow resumption of the oscillations.

Preferably, however, the capacitor 29 is of sufficient capacity that the emitter voltage is held constant when the circuit is operating. Under these conditions the circuit will be turned off at a rate determined by the resistor 30 and the capacitor of filter 31. As oscillations build up, a greater peak base current is required than can be supplied through resistor 25, and, therefore, the base current must be supplied from capacitor 31 through resistor 30 if oscillations are to continue. When the voltage of capacitor 31 falls off, oscillations will cease and will not resume until the capacitor 31 is recharged. The value of the resistor 30 determines the overall sensitivity and stability of the system. Reducing the value of resistor 30 will increase the stability of the oscillator-detector at the sacrifice of sensitivity.

If desired, the bypass capacitances 24 and 29 may comprise high and low pass capacitors.

In the use of the invention, the radiofrequency, electromagnetic detector of the invention may be combined with an ultrasonic detector in such a manner that the fields of the two devices overlap to provide an area of maximum security, with minimized probability of a false alarm. Under these conditions, both detectors should be required to detect an object before an alarm can result.

We claim:

1. In a motion detector, self-pulsing oscillator-detector means for transmitting short bursts of a field of radiofrequency electromagnetic energy and for detecting changes in the periodicity of the pulses caused by movement of an object in the field, said self-pulsing oscillator-detector comprises a transistor, antenna means connected to the base of said transmitter, a source of current, a radiofrequency ground capacitor connected to the collector of said transistor, an output conductor connected to the base of said transistor, and a resistor and a capacitor in said output conductor, whereby said means emits output pulses at a variable frequency determined by the motion of the object and responds to the variation of the periodicity of said output pulses to provide information indicative of motion of the object.

2. A motion detector as defined in claim 1 wherein said last-mentioned means comprises a frequency discriminator for converting the output pulse frequency of said self-pulsing oscillator-detector means to a varying D.C. voltage the magnitude of which varies at a rate determined by the rate of motion of the object.

3. In a motion detector, a self-pulsing oscillator-detector means for transmitting short bursts of a field of radiofrequency electromagnetic energy and detecting return energy, said self-pulsing oscillator-detector means including means for emitting output pulses at a frequency determined by the frequency of the returned energy, and means operatively connected to said oscillator-detector means and operable for indicating movement of an object in said field in response to variations in the frequency of said output pulses, said self-pulsing oscillator-detector comprising a transistor, antenna means connected to the base of said transmitter, a source of current, a radiofrequency ground capacitor connected to the collector of said transistor, an output conductor connected to the base of said transistor, and a resistor and a capacitor in said output conductor.

4. A motion detector as defined in claim 3, comprising frequency discriminator means connected to the output of said self-pulsing oscillator-detector to receive said pulses and convert the pulse frequency to a D.C. voltage output the magnitude of which is determined by said pulses, and means responsive to the output from frequency discriminator for effecting operation of said means operatively connected to said self-pulsing oscillator-detector means.

5. A motion detector as defined in claim 3 comprising frequency discriminator means connected to the output of said self-pulsing oscillator-detector to receive said pulses and convert the pulse frequency to a D.C. voltage output the magnitude of which is determined by said pulses, said means operatively connected to said self-pulsing oscillator-detector means, and means including an amplifier responsive to the output from said frequency discriminator for effecting operation of said means operatively connected to said self-pulsing oscillator-detector means.

6. A motion detector defined in claim 3 comprising frequency discriminator means connected to the output of said self-pulsing oscillator-detector to receive said pulses and convert the pulse frequency to a D.C. voltage output the magnitude of which is determined by said pulses, means including a trigger circuit responsive to the output from said frequency discriminator, and counter means responsive to signals from said trigger circuit for effecting operation of said means operatively connected to said self-pulsing oscillator-detector means only in response to a plurality of said trigger signals.

7. A motion detector as defined in claim 3 comprising frequency discriminator means connected to the output of said self-pulsing oscillator-detector to receive said pulses and convert the pulse frequency to a D.C. voltage output the magnitude of which is determined by said pulses, means including a trigger circuit responsive to the output from said frequency discriminator, counter means responsive to signals from said trigger circuit to produce an output signal only in response to a plurality of said trigger signals, and a further trigger circuit for effecting operation of said means operatively connected to said self-pulsing oscillator-detector means in response to said output signal from said counter means.

8. A motion detector as defined in claim 7 wherein said means operatively connected to said self-pulsing oscillator-detector comprises an alarm.

9. A motion detector as defined in claim 7 wherein means operatively connected to said self-pulsing oscillator-detector comprises an alarm.

10. A motion detector as defined in claim 3, including a capacitor connecting the emitter of said transistor to ground.

* * * * *